Jan. 19, 1926.  
A. G. HENRICKS  
1,570,061  
HOISTING MECHANISM FOR EXCAVATING CRANES  
Filed March 25, 1925   3 Sheets-Sheet 1

INVENTOR.  
ARTHUR G. HENRICKS.  
BY  
Bottum, Hudnall, Secher and McNamara.  
ATTORNEYS.

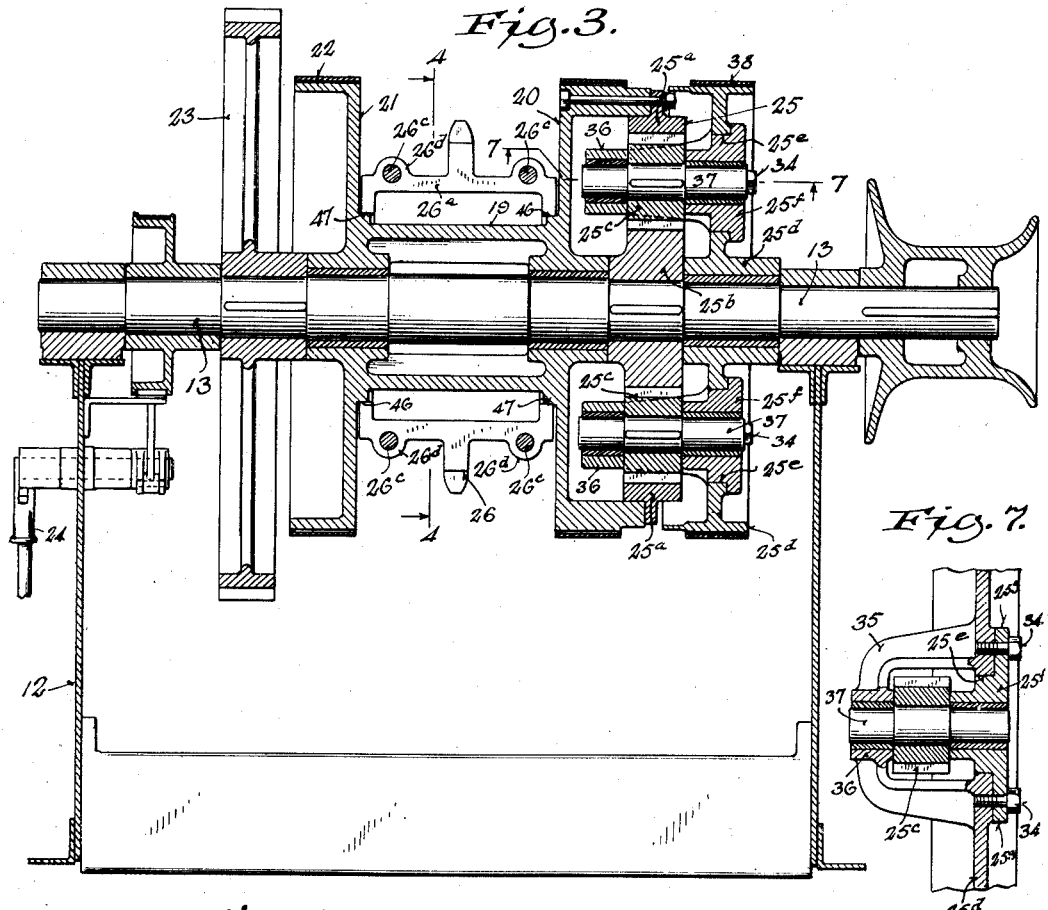
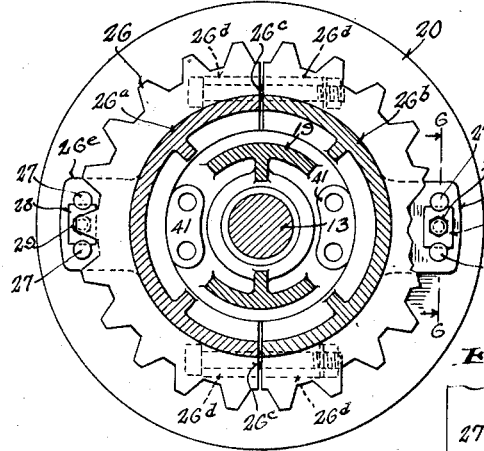
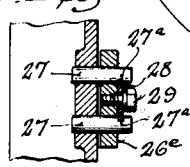
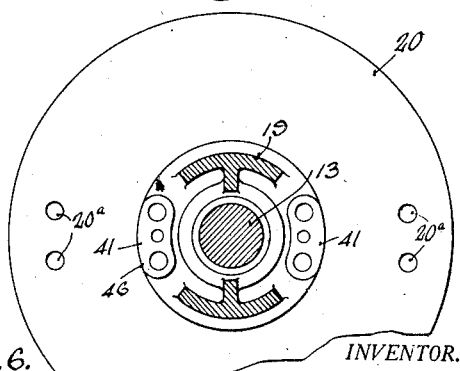

Jan. 19, 1926. 1,570,061
A. G. HENRICKS
HOISTING MECHANISM FOR EXCAVATING CRANES
Filed March 25, 1925   3 Sheets-Sheet 3
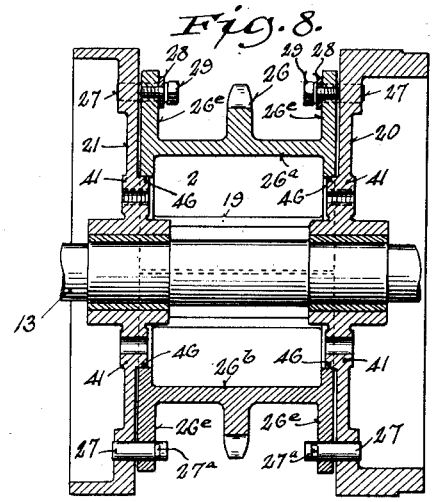
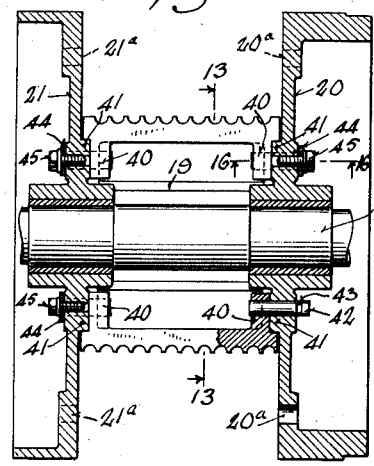
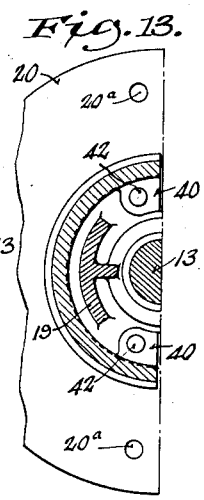
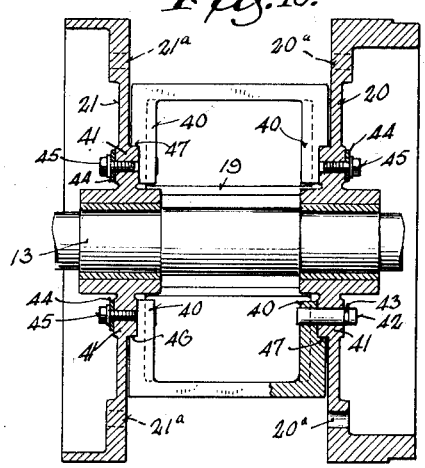
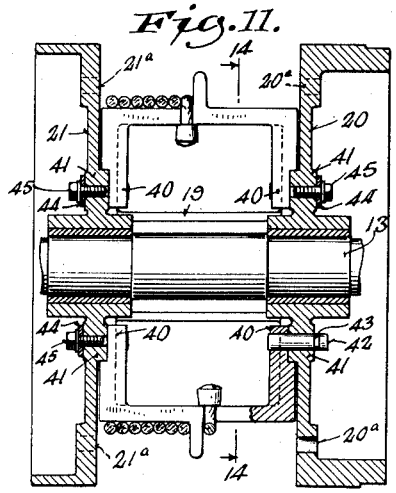
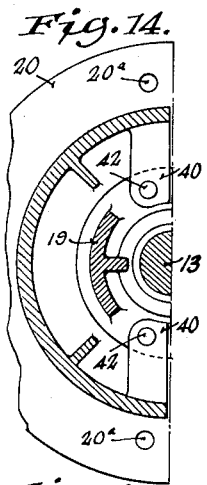
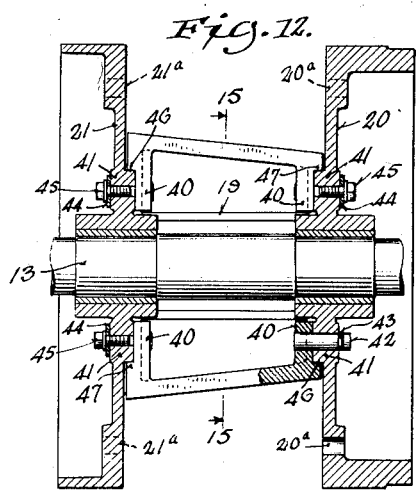
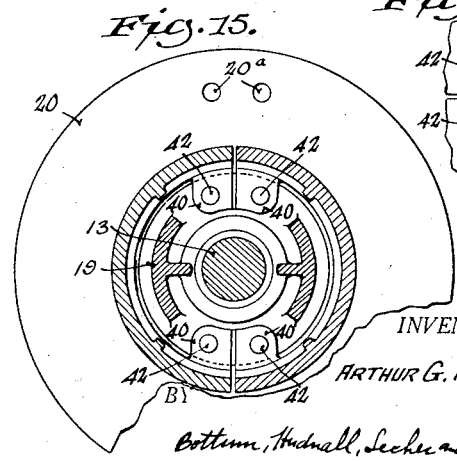
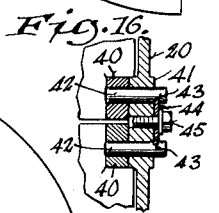
INVENTOR.
ARTHUR G. HENRICKS.
BY
ATTORNEYS.

Patented Jan. 19, 1926.

1,570,061

UNITED STATES PATENT OFFICE.

ARTHUR G. HENRICKS, OF WAUWATOSA, WISCONSIN, ASSIGNOR TO HARNISCHFEGER CORPORATION, OF MILWAUKEE, WISCONSIN, A CORPORATION OF WISCONSIN.

HOISTING MECHANISM FOR EXCAVATING CRANES.

Application filed March 25, 1925. Serial No. 18,083.

*To all whom it may concern:*

Be it known that I, ARTHUR G. HENRICKS, a citizen of the United States, residing at Wauwatosa, in the county of Milwaukee and State of Wisconsin, have invented certain new and useful Improvements in Hoisting Mechanism for Excavating Cranes, of which the following is a specification, reference being had to the accompanying drawing, forming a part thereof.

This invention relates to improvements in excavator cranes and more particularly to the hoisting mechanism and apparatus of such crane.

Cranes of this character are generally mounted on tractors and comprise in general a rotatable platform, hoisting and digging drums mounted thereon, a prime mover, transmission mechanism for connecting the prime mover to the drums for operating the latter at varying speeds in the same or reverse directions, control levers for said mechanism, a boom pivotally connected to said platform for supporting the excavating apparatus which is generally in the form of various attachments such as a clam shell bucket, dragline bucket, power shovel, power hoe, etc., and means such as cables or chains for connecting the excavating apparatus to the drums for operation thereby. The drum positioned at the forward end of the platform is generally known as the digging drum while the drum next in line to the rear is generally known as the hoisting drum. These two drums are employed in operating all of the various excavating attachments of the crane with the exception of the power shovel attachment. In order to operate the power shovel attachment it is now the practice to either clamp a sprocket wheel around the digging drum or remove the entire drum together with its associated parts and mechanism and substitute therefore a sprocket wheel. This sprocket wheel is connected by suitable driving chain with a sprocket wheel carried on the shipper shaft journaled on the boom, which shaft is provided with a pinion meshing with a rack fixed to the dipper stick. In this manner by driving the sprocket wheel in one direction or the other the dipper stick may be operated to effect the desired crowding out action of the shovel during a digging operation or a racking in thereof when positioning the shovel for digging or in manipulating the same after it has been loaded. In order that this sprocket wheel mounted on or in lieu of the digging drum may be operated in reverse directions as desired in order to effect the aforementioned crowding out or racking in movement of the dipper stick, provision of course, must be made for driving the sprocket wheel in either forward or reverse directions. This reversible drive has been worked out in practice in numerous ways, the most desirable one, however, employing reversing mechanism of the planetary gear type mounted directly on the digging drum shaft. It is now generally the practice to equip the crane as originally assembled or manufactured with a planetary reverse gear combined with the digging drum in such wise that the two comprise substantially a unitary assembly. In this manner the crane may be employed for operating all of the various excavating attachments, with the exception of the power shovel, without changes or alterations. It has heretofore also been proposed to provide a removable sprocket wheel which may be clamped around the digging drum, thus quickly adapting the machine for power shovel work. According to another practice the machine as originally assembled includes the planetary reverse gear mounted on the digging drum shaft together with a sprocket wheel for the power shovel work. In machines so equipped, however, in order to change from power shovel operation to other forms of excavating operations it has been necessary to remove the entire sprocket wheel and planetary reverse gear combination and to substitute therefor an ordinary drum assembly for receiving and operating one of the cables of such attachments. In still another type of machine mechanism mounted and operated independently of the digging shaft is employed for imparting a reverse drive to said shaft for power shovel work, this being in lieu of the planetary gear type of reverse mechanism. These machines are either equipped with sprocket wheel or drum assemblies necessitating complete removal and substitution each time the machine is converted.

All of these practices have a number of distinct drawbacks or disadvantages. In the machine which is originally equipped with the planetary reverse gear and drum, assembled and so constructed and arranged as to receive a removable sprocket wheel when power shovel work is to be executed, only the one drum is available for all of the many digging and excavating operations whereas it is distinctly advantageous to employ or use drums of different sizes and shapes for the different excavating operations. Then again, in machines so constructed the planetary reverse gear is constantly operated in one direction during employment of the digging drum, thus occasioning considerable wear and tear thereon during these operations where such gear is serving no useful purpose whatever and in fact is acting as drag on the operation of the other parts. As above explained, the planetary reverse gear or any other reverse gear is only necessary for power shovel work.

In machines originally equipped with the planetary reverse gear and sprocket wheel combination it is necessary to remove this entire combination and substitute therefor an ordinary drum assembly when any of the other various excavating attachments are employed. This entails temporary shutting down of the machine and a considerable loss of time. In machines employing mechanism other than a planetary gear for obtaining the reverse drive for power shovel work the same objections are present. If such machine is originally equipped with a drum assembly on the digging shaft, it must be entirely removed when the machine is converted for power shovel work and a sprocket wheel assembly substituted, whereas if such machine is originally equipped with a sprocket wheel assembly the reverse is true.

The present invention contemplates an improvement which will overcome all of these objections and disadvantages and, briefly stated, comprises standard or permanent equipment for the digging drum shaft, said equipment including a planetary reverse gear together with a driving connection between the brake drum thereof and the main clutch drum of said shaft, said driving connection being in the form of a spider or the like of such size and construction as to receive or accommodate removable drums of various shapes and sizes and a sprocket wheel, interchangeably. Both the drums and the sprocket wheel are preferably made in sections so that they may be fitted together in operative position on the spider. When a drum is used it is assembled on the spider, and when the sprocket wheel is used the drum is removed and the sprocket wheel assembled on the spider. In other words, the drums and sprocket wheel may be interchangeably used by fitting together the respective parts thereof upon the driving spider associated with the planetary reverse gear and other mechanism carried by the digging shaft.

The invention also contemplates the provision of means whereby the planetary reverse gear may be entirely disconnected during use of the machine for the operation of the various excavating attachments wherein a reverse drive is not necessary, thus relieving the reverse gear of all unnecessary wear.

Many other objects and advantages of the invention will appear from the following description taken in consideration with the accompanying drawings wherein several forms of the invention are illustrated.

Fig. 3 is an enlarged section on line 3—3 of Fig. 1;

Fig. 4 is a section on line 4—4 of Fig. 3, partly broken away;

Fig. 5 is a view similar to Fig. 4, the parts comprising the sproket wheel being removed;

Fig. 6 is a section on line 6—6 of Fig. 4;

Fig. 7 is a section on line 7—7 of Fig. 3;

Figs. 8 to 12 are central vertical sections taken on the line 3—3 of Fig. 1, showing drums of various sizes and shapes for different kinds of service fitted upon and secured to the driving spider of the present invention;

Fig. 13 is a section on line 13—13 of Fig. 9;

Fig. 14 is a section on line 14—14 of Fig. 11;

Fig. 15 is a section on line 15—15 of Fig. 12; and

Fig. 16 is a section on line 16—16 of Fig. 9.

Figure 1:
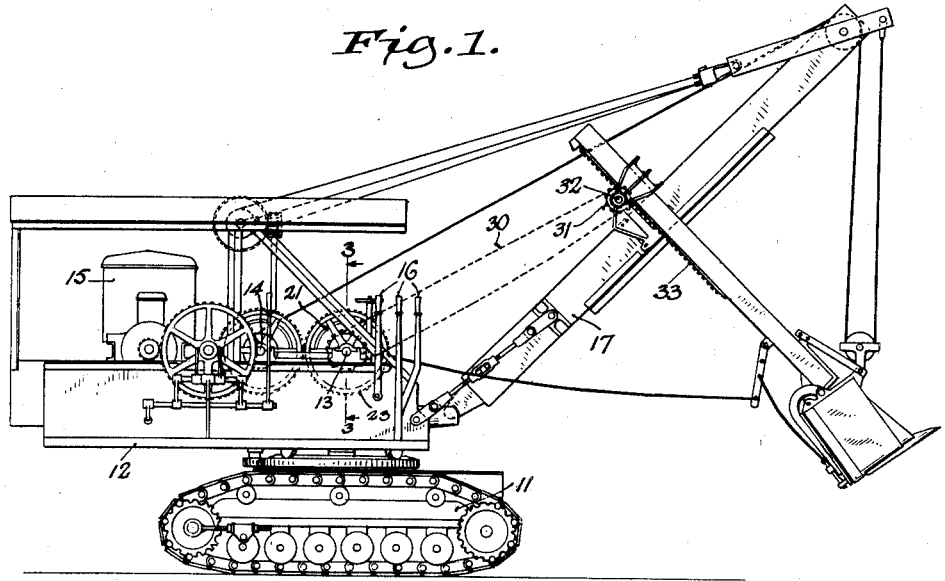
Figure 1 is a side elevation showing an excavator crane provided with a boom and power shovel attachment and, in a general way, the cable and chain connections to the hoisting and digging drums, respectively, for operating the shovel.
Figure 2:
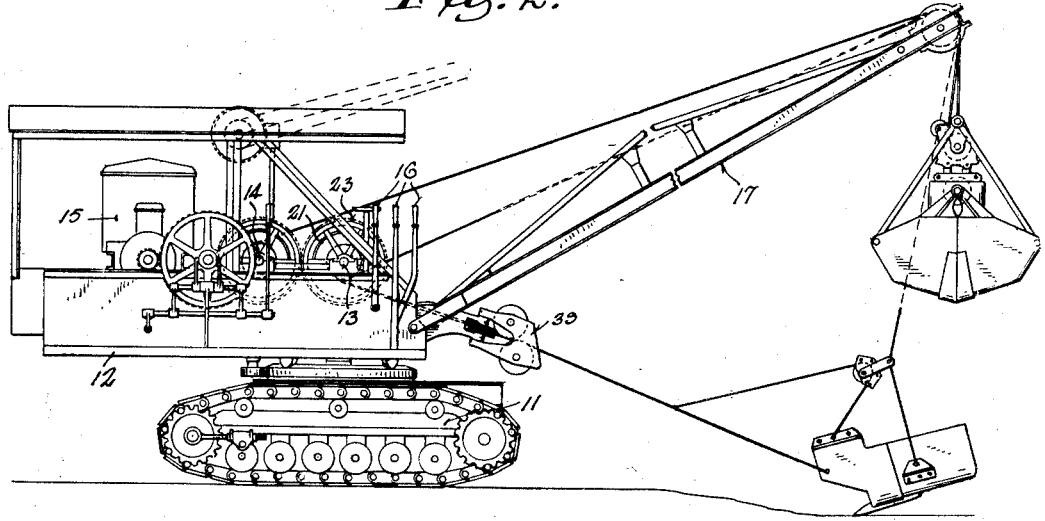
Fig. 2 is a side elevation showing the excavator crane equipped with drag line and clam shell bucket attachments, it being of course understood that only one of these attachments is applied and used at a time, both being shown merely for purposes of compactness and simplicity in illustrating.

Referring more particularly to the drawings, excavator cranes of the character referred to are shown in Figs. 1 and 2, these machines comprising, in general, a suitable tractor 11, a rotatable platform 12 mounted thereon, a digging shaft 13 mounted near the forwad end of the platform, a hoisting shaft 14 mounted to the rear thereof and suitably geared to shaft 13 for the transmission of power from one to the other, a prime mover 15 for driving said shafts, control levers 16 and a boom 17 pivotally connected to the forward end of the platform in advance of the digging shaft for supporting excavator equipment of any of the various types, the latter being suitably connected to the digging and hoisting shafts previously referred to for operation thereby. The hoisting shaft of these cranes is provided with equipment or apparatus such as previously described whereby said shaft may be driven in reverse directions and employed either for the operation of a drum or a sprocket wheel.

According to the present invention, it is contemplated to provide a driving spider or the like 19 associated with and connected between the brake drum 20 of the planetary reverse gear and the main clutch drum 21, in lieu of a fixed or permanent drum or sprocket wheel such as heretofore employed in apparatus of this character, for operating or controlling the various types of excavating equipment. With this object in view, the driving spider may be formed integrally with or separately formed and attached to the spaced apart brake and clutch drums 20 and 21 so as to form a fixed rigid driving connection between these drums as shown more clearly in Fig. 3. This assembly, comprising the two drums 20 and 21 and the connecting spider 19, is loosely mounted on the digging shaft 13 as a unit, and may be rotated with said shaft through means of the clutch band 22 acting on the clutch drum 21, this band being connected to the large gear wheel 23 fixed on shaft 13 for rotation therewith. Suitable actuating means shown partly at 24 and described and claimed in detail in copending application of Holger L. Mitchell, Serial No. 470, filed January 5, 1925 is associated with gear wheel 23 and clutch band 22 for actuating the latter to cause it to grip clutch drum 21 thus causing rotation of said drum and spider 19 at varying speeds and in the direction of gear wheel 23. The planetary reverse gear for causing rotation of the driving spider in the other direction is indicated generally by reference character 25 and will be hereinafter described more in detail.

As previously described, the present invention contemplates the accommodation of drums of various shapes and sizes and a sprocket wheel for power shovel work, interchangeably on the driving spider. The sprocket wheel, as also previously pointed out, is only used for power shovel work. This sprocket wheel is designated in the drawings by reference character 26. According to the present invention, this sprocket wheel is preferably formed of two parts 26$^a$ and 26$^b$ adapted to be fitted about the spider 19 and held together thereon in assembled relation by means of bolts or the like 26$^c$ passing through suitable lugs 26$^d$ cast integrally with the parts 26$^a$ and 26$^b$, respectively. For the purpose of securing the sprocket wheel on spider 19 and against rotation with respect thereto, the parts 26$^a$ and 26$^b$ are provided with flanges 26$^e$ having openings therethrough which register with openings 20$^a$ and 21$^a$ in the drums 20 and 21 to receive pins 27. A keeper plate 28 is arranged between pins 27 and secured to flanges 26$^e$ by means of bolts 29, as more clearly shown in Fig. 6, the edges of plate 28 fitting into grooves 27$^a$ of pins 27 as shown, the pins thereby being locked against accidental displacement. By merely removing bolts 26$^c$ and 29 and pins 27 the parts comprising the sprocket wheel 26 may be readily removed.

The sprocket wheel 26 is employed in power shovel work in the usual manner, namely, for effecting the crowding out or racking in of the dipper stick. For this purpose a driving chain 30 extends from the sprocket wheel outwardly and engages a second sprocket wheel 31 fixed on the shipper shaft 32 mounted on the boom. This shipper shaft carries a pinion (not shown) which engages a rack 33 on the dipper stick so that the latter may be operated or thrust in either direction upon rotation of the sprocket wheel. The driving spider and hence the sprocket wheel 26 secured thereto may be rotated in either direction through the instrumentalities previously referred to.

The planetary reverse gear 25 whereby the driving spider may be rotated in a reverse direction as compared with the rotation of the digging shaft, comprises an internal gear 25$^a$ secured in any suitable manner to the brake drum 20, a gear 25$^b$ fixed to shaft 13, idler or planet gears 25$^c$ arranged between gears 25$^a$ and 25$^b$ and in mesh therewith. A clutch drum 25$^d$ is loosely mounted on shaft 13 adjacent gear 25$^b$ and is provided with openings 25$^e$ into which are fitted bearing members 25$^f$ having lugs 25$^g$ through which bolts 34 extend for the purpose of securing the bearing members to clutch drum 25$^d$ for rotation therewith, bolts 34 being screwed into the drum, as shown in Fig. 7. Yokes 35 cast integrally with clutch drum 25$^d$ provide bearings 36 for supporting the inner ends of pins 37 on which the planet gears 25$^c$ are fixed, the outer ends of the pins being journaled in bearing members 25$^f$. A clutch band 38 is arranged upon the clutch drum 25$^d$ to retard or prevent rotation thereof. To those skilled in the art it will be obvious that upon release of the clutch band 22 and application of band 38, sprocket wheel 26 will be rotated in a direction opposite to the direction of rotation of shaft 13, during which rotation shipper shaft 32 will be rotated in a direction to cause one movement of the dipper stick. The other movement thereof is accomplished through direct drive from the digging shaft 13, by releasing band 38 and applying band 22.

As the planetary gear arrangement just described is used only during power shovel work, it is preferred, during operation of the various other types of excavating apparatus, to disconnect the planetary reverse gear so as to avoid unnecessary wear and tear thereon. To do this it is merely necessary to unscrew bolts 34 and remove bearing members 25$^f$ together with pins 37 and planet gears 25$^c$ mounted thereon, openings 25$^e$ being large enough to permit gears 25$^c$ to pass through the same.

When it is desired to attach and operate excavating equipment of a type other than the power shovel attachment such, for instance, as a clam shell bucket, dragline excavator, back filler, power hoe or back acting shovel, pile driver, skimmer scoop, magnet crane or other crane attachments, etc. it is merely necessary to remove sprocket wheel 26 in the manner explained above and substitute therefor a drum of any desired size or style for the particular work in hand. A number of different types of drums are shown in Figures 9 to 12 inclusive. In each case, these drums are of two part construction, said parts designed to be fitted together upon the driving spider 19 and secured to the adjacent clutch and brake drums 20 and 21 so as to prevent relative rotation of the sectional drum thus formed with reference to the spider.

For clam-shell bucket, skimmer scoop, pile driver, and magnet crane work a straight, cylindrical drum having a plain or grooved periphery is preferred. Illustrations of drums of this character are shown in Figs. 9 and 10. These drums may be of any desired size, dependent upon the speed of operation desired and, of course, also to some extent upon the power desired. For instance, in clam-shell bucket work more speed and less power are generally required or desirable than in certain other types of excavating operations. In this class of work, therefore, a drum of comparatively large diameter may be employed. Instead of providing a separate drum of larger diameter as just explained, a multipiece shell having grooves therein may be applied or fixed around a smaller drum of substantially standard size. A shell of this kind is commonly known in the art as "lagging".

For dragline, back filler, and power hoe operations a frustro-conical drum, such as is shown in Fig. 12, is generally desired. A drum of this design is preferred for work of this character by reason of the fact that a cable guiding device commonly called a "fairlead" is employed immediately forwardly of the drum for guiding the dragline. A cable guiding device of this character is shown at 39 in Fig. 2 of the drawings in operative position with respect to both the dragline and the drum. The "fairlead" is so close to the drum that should the latter be of plain cylindrical design the dragline cable would tend to rap in zigzag fashion on the drum, causing the various turns of the cable to overlap one another. This, as is well known to those skilled in the art, causes pronounced wear on the cable and very materially shortens the life thereof. By using a drum of frustro-conical design such as shown in Fig. 12, this is overcome, the dragline cable winding thereon in successive adjacent turns smoothly from one end of the drum to the other.

In still another operation of which excavator cranes of the character herein described are capable, a mere back and forth pulling action is necessary. In this class of work one stretch of cable may be employed, the opposite ends thereof being attached to opposite side of a single flanged drum such as shown in Fig. 11, for instance. Upon rotation of the drum in one direction one run of the cable is paid out and the other pulled in. The reverse takes place upon rotation of the drum in the opposite direction. This drum is provided with a central circumferential flange which in effect divides the drum into two distinct parts, one of which receives one run of the cable and the other the other.

Various ways and means, of course, may be devised for attaching the various drums to the spider. In the drawings, means generally similar to the attaching means for the sprocket wheel 26 previously described in detail is shown. For instance, each of the various drums shown is provided with a plurality of inwardly extending apertured lugs 40 adapted to line up with bosses 41 formed on the clutch and brake drums 20 and 21 respectively. These bosses are also apertured, pins 42 projecting through the apertures in the bosses and lugs. Pins 42 are slotted or grooved as at 43 adjacent their outer ends to receive the opposite edges of a keeper plate 44 the latter in turn being held in position by means of a bolt 45. It will be noted that the bosses 41 of drums 20 and 21 provide shoulders 46 adapted to engage shoulders 47 provided in the lugs 40 of the drum sections when the latter are operatively positioned. This materially aids in centering the drum sections and in lining up the apertures in the bosses and the lugs for the reception of the retaining pins 42. It is also desired to call attention to the ease and quickness with which a drum may be disconnected by reason of the particular retaining means employed. When it is desired to remove a given drum from the spider it is merely necessary to remove keeper plates 44 and then to knock or punch the pins 42 inwardly through the apertures and into the interior of the drum. The drum sections are in this manner completely detached and may be lifted from place, and the pins employed for attaching the next drum in position.

From the foregoing it will be seen that means have been provided in combination with the clutch and brake bands ordinarily mounted on the digging shaft of an excavator crane whereby either a sprocket wheel for power shovel work or drums of various kinds and descriptions for other excavating operations may be interchangeably placed in position without in any way disturbing the other elements of the apparatus or necessitating dismantlement thereof. It will also be seen that with the present improvements the machine is not in any sense limited or restricted to the use of a given drum as is generally the case in present day practice. On the other hand, a drum of any desired size or type deemed best for the particular work in hand may be used. It will also be obvious that sprocket wheels of various sizes may be used for power shovel work, depending upon the capacity of the bucket employed. The feature whereby the planet gears 25$^c$ of the planetary reverse gear may be disconnected or removed so as to avoid wear thereon during operations wherein such gear is not necessary is also an important one.

It is desired to point out that the present improvements involving the spider and interchangeable sprocket wheel and drum feature is in no wise limited to a combination involving a planetary reverse gear. For instance, in many excavator cranes now on the market other mechanism is employed for securing a reversible drive. The present improvements will be found just as useful and effective in machines of this character as in those wherein the planetary reverse gear is employed. This explanation is offered so that the invention will in no wise be limited to the particular adaptation shown in the drawings.

It will be obvious to those skilled in the art that the present invention is susceptible to many advantages and modifications without departing from the spirit thereof and accordingly it is not desired to limit or restrict the same to the particular forms or arrangements of parts herein illustrated and described except where limitations may appear in the appended claims.

The invention claimed is:

1. In an excavator crane, a shaft, a spider loosely mounted thereon and adapted to receive and operate a driving sprocket for power shovel operation or drums of different size and shape for various other kinds of excavating equipment, and mechanism adapted to connect said spider to said shaft for rotation thereby in either direction.

2. In an excavator crane of the character described, a shaft, a spider loosely mounted thereon and adapted to receive and operate a driving sprocket for power shovel operation or drums of different size and shape for various other kinds of excavating equipment, a drum connected to each end of said spider for rotation therewith, a planetary gear associated with one of said drums and adapted to connect said spider to said shaft, for reverse rotation with respect to the latter for power shovel work, certain of the gears comprising said planetary gear being removable whereby said gears may be removed from operative position during use of said crane with said other kinds of excavating equipment.

3. In an excavator crane of the character described, a shaft, a spider loosely mounted thereon, a drum connected to each end of said spider for rotation therewith, said spider being adapted to receive and operate a driving sprocket for power shovel operations and drums of different size and shape for various other kinds of excavating equipment, said drums being provided with openings adapted and arranged to receive means for fixing said sprocket and said second-mentioned drums against rotation with respect to said spider.

4. In an excavator crane, a shaft, a spider loosely mounted thereon, and a driving element comprising a plurality of parts fitted together about said spider, said spider being provided with drums at each end thereof, the parts of said element and one of said drums being provided with registering openings, pins arranged in said openings to hold said parts in assembled relation about said spider and against rotation with respect thereto, a member arranged between said pins and in interlocking relation therewith whereby the same are held in operative position in said openings, and means for holding said member in interlocking relation with said pins.

5. In apparatus of the character described, a shaft, a drum loosely mounted thereon and provided with an internal gear, a second gear fixed to said shaft, a second drum loosely mounted on said shaft adjacent said second gear and provided with an opening, an idler gear arranged in mesh with said internal and second gears, and means supporting said idler gear for rotation with said member and for removal through said opening from operative relation with said internal and second gears.

6. In apparatus of the character described, a shaft, a drum loosely mounted thereon and provided with an internal gear, a second gear fixed to said shaft, a second drum loosely mounted on said shaft adjacent said second gear and provided with an opening and a bearing coaxial therewith and spaced therefrom, a pin having the ends thereof journaled in said opening and said bearing, and an idler gear mounted on said pin between said opening and said bearing and in mesh with said internal and said second gears, said idler gear being removable through said opening.

7. The combination with the brake and clutch drums on the digging shaft of an excavator crane, of a spider extending between said drums and rigidly connected thereto, said spider being adapted to receive interchangeably various types of operating elements for excavating equipment.

8. In an excavator crane of the character described, a shaft, a spider mounted thereon, drums connected to each end of said spider for rotation therewith, a driving element comprising a plurality of parts fitted together upon said spider and provided with lugs arranged to lie against one of said drums, said lugs and said drum being provided with registering openings, pins arranged in said openings whereby said parts are held in assembled relation and against rotation with respect to said spider, and means for holding said pins in operative position in said openings.

9. In an excavator crane of the character described, a shaft, a spider mounted thereon and provided at its ends with drums, and an operating element for excavating equipment comprising a plurality of parts fitted upon and secured to said spider for rotation therewith, said drums and said parts having shoulders adapted and arranged to engage and position said parts in operative relation with respect to said spider.

10. In an excavator crane of the character described, a shaft, a spider mounted thereon and provided at its ends with drums, and an operating element for excavating equipment comprising a plurality of parts fitted upon said spider and provided with flanges arranged against said drums, and means coacting with said drums and said flanges whereby said element is held against rotation with respect to said spider.

11. In an excavator crane of the character described, a shaft, a spider mounted thereon and provided at its ends with drums, and an operating element for excavating equipment comprising a plurality of parts fitted upon said spider and provided with flanges arranged against said drums, said flanges and drums being provided with registering apertures, pins arranged in said apertures and provided with grooves at adjacent ends thereof, plates arranged between adjacent pins and within said grooves, and means for holding said plates in operative position.

12. The combination with the brake and clutch drums on the digging shaft of an excavator crane, of a spider extending between said drums and rigidly connected thereto, said spider being adapted to receive interchangeably various types of operating elements for excavating equipment, and a planetary gear associated with one of said drums and adapted for cooperation therewith to connect said spider to said shaft for rotation thereby, certain of the gears comprising said planetary gear being removable from operating position independently of said spider and said parts associated therewith.

13. In an excavator crane of the character described, a shaft, a spider mounted thereon and provided at its ends with drums, a hollow driving element for excavating equipment comprising a plurality of parts fitted upon said spider and secured thereto for rotation therewith, said drums and said parts being provided with registering openings, pins arranged in said openings for holding said parts in assembled relation, said pins being adapted for movement from operative position by passing through said openings into said element to permit removal of the parts thereof from said spider, and means for holding said pins in operative position in said openings.

14. In an excavator crane of the character described, a shaft, a spider mounted thereon and provided at its ends with drums, a driving element for excavating equipment comprising a plurality of parts fitted upon said spider and secured thereto for rotation therewith, said drums and said parts being provided with registering openings, straight-sided pins arranged in said openings for holding said parts in assembled relation and adapted for axial movement in said openings from operative position therein, and means for holding said pins in operative position.

In witness whereof I hereto affix my signature.

ARTHUR G. HENRICKS.